United States Patent
Kim et al.

(10) Patent No.: US 10,802,574 B2
(45) Date of Patent: *Oct. 13, 2020

(54) SEMICONDUCTOR DEVICE AND METHOD OF OPERATING THE SAME

(71) Applicant: Samsung Electronics Co., Ltd., Suwon-si, Gyeonggi-do (KR)

(72) Inventors: Je Kook Kim, Yongin-si (KR); Sung Ha Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,087

(22) Filed: Jan. 13, 2020

(65) Prior Publication Data
US 2020/0150746 A1    May 14, 2020

Related U.S. Application Data

(63) Continuation of application No. 15/680,535, filed on Aug. 18, 2017, now Pat. No. 10,539,999.

(30) Foreign Application Priority Data

Aug. 25, 2016 (KR) .......... 10-2016-0108289
Oct. 27, 2016 (KR) .......... 10-2016-0140948

(51) Int. Cl.
| | |
|---|---|
| G06F 13/10 | (2006.01) |
| G06F 1/3296 | (2019.01) |
| G06F 13/42 | (2006.01) |
| G06F 13/38 | (2006.01) |
| G06F 1/324 | (2019.01) |
| G06F 1/26 | (2006.01) |

(52) U.S. Cl.
CPC ............ *G06F 1/3296* (2013.01); *G06F 1/266* (2013.01); *G06F 1/324* (2013.01); *G06F 13/385* (2013.01); *G06F 13/4282* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 9,176,243 B2 | 11/2015 | Zuercher | |
| 9,279,897 B2 | 3/2016 | Zuercher | |
| 9,400,546 B1 | 7/2016 | Agarwal et al. | |
| 9,653,129 B2 | 5/2017 | Shen et al. | |
| 10,014,637 B2 * | 7/2018 | Hasegawa | G01R 19/16528 |

(Continued)

OTHER PUBLICATIONS

STMicroelectronics. "Protable Device, Cable Assembly, and USB System". APEC 2016 USB Power. Apr. 20, 2016. http://www.st.com/content/ccc/resource/sales_and_marketing/presentation/product_presentation/group0/5a/b1/8e/6c/2b/0d/46/3c/Apec/files/APEC_2016_USB_Power.pdf/_jcr_content/translations/en.APEC_2016_USB_Power.pdf.

*Primary Examiner* — Cheng Yuan Tseng
(74) *Attorney, Agent, or Firm* — Harness, Dickey & Pierce, P.L.C.

(57) ABSTRACT

A semiconductor device is provided. The semiconductor device includes a receptacle which comprises a plurality of pins according to a universal serial bus (USB) type-C receptacle interface and a power delivery integrated circuit (PD IC) which transmits a toggle voltage signal that toggles between a first voltage level and a second voltage level to a first pin among the pins and detects a voltage level of a signal output from the first pin.

17 Claims, 12 Drawing Sheets

(56) References Cited

U.S. PATENT DOCUMENTS

2016/0116509 A1    4/2016   Kim
2016/0181722 A1    6/2016   Tsai et al.
2016/0186973 A1    6/2016   Chien
2016/0188506 A1    6/2016   Wang et al.
2016/0217307 A1    7/2016   Huang et al.

* cited by examiner

FIG. 2

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | $V_{BUS}$ | CC1 | D+ | D− | SBU1 | $V_{BUS}$ | RX2− | RX2+ | GND |
| GND | RX1+ | RX1− | $V_{BUS}$ | SBU2 | D− | D+ | CC2 | $V_{BUS}$ | TX2− | TX2+ | GND |
| B12 | B11 | B10 | B9 | B8 | B7 | B6 | B5 | B4 | B3 | B2 | B1 |

SEMICONDUCTOR DEVICE AND METHOD OF OPERATING THE SAME

This application is a continuation of U.S. application Ser. No. 15/680,535, filed on Aug. 18, 2017, which claims the benefit of Korean Patent Application No. 10-2016-0108289, filed on Aug. 25, 2016 and Korean Patent Application No. 10-2016-0140948, filed on Oct. 27, 2016, in the Korean Intellectual Property Office, the entire disclosure of each of which is incorporated herein in its entirety by reference.

BACKGROUND

1. Field

Example embodiments of the inventive concepts relate to a semiconductor device and/or a method of operating the same.

2. Description of the Related Art

Universal serial bus (USB) technology is being developed in line with the trend toward a smaller, thinner, and lighter form factor. As a representative example, USB type-C technology defines a receptacle, a plug, and a cable that may meet this trend.

A USB type-C receptacle interface provides a pull-up current to a specific pin (e.g., a CC1 signal pin or a CC2 signal pin) included in a receptacle and observes whether the specific pin is pulled up in order to determine whether another USB device has been connected to the receptacle. However, in some circumstances, even when no other USB device is connected to the receptacle, the pull-up current may be provided to the specific pin.

For example, if foreign matter, particularly water, is applied to the receptacle, the pull-up current may flow to a GND signal pin of the receptacle, thereby corroding pins included in the receptacle, which may cause problems when providing bus power ($V_{BUS}$).

SUMMARY

Example embodiments of the inventive concepts provide a semiconductor device configured to determine whether water has been applied to a receptacle before providing bus power ($V_{BUS}$).

Example embodiments of the inventive concepts also provide a method of operating a semiconductor device which can determine whether water has been applied to a receptacle before providing bus power ($V_{BUS}$).

However, example embodiments of the inventive concepts are not restricted to the one set forth herein. The above and other aspects of the inventive concepts will become more apparent to one of ordinary skill in the art to which the inventive concept pertains by referencing the detailed description of the inventive concept given below.

According to some example embodiments of the inventive concepts, there is provided a semiconductor device a receptacle including a plurality of pins according to a universal serial bus (USB) type-C receptacle interface; and a power delivery integrated circuit (PD IC) configured to transmit a toggle voltage signal to a first pin among the pins such that the toggle voltage signal toggles between a first voltage level and a second voltage level, and to detect a voltage level of a signal output from the first pin.

According to some example embodiments of the inventive concepts, there is provided a semiconductor device including a receptacle including a plurality of pins according to a USB type-C receptacle interface, the plurality of pins including a first pin and a second pin; a PD IC configured to transmit a voltage signal to the first pin, and to detect a signal output from the first pin; and a USB chipset configured to transmit a toggle voltage signal to the second pin such that the toggle voltage signal toggles between a first voltage level and a second voltage level, and to detect a voltage level of a signal output from the second pin.

According to some example embodiments of the inventive concepts, there is provided a method of operating a semiconductor device, the method includes transmitting a toggle voltage signal to a first pin among a plurality of pins included in a receptacle according to a USB type-C receptacle interface such that the toggle voltage toggles between a first voltage level and a second voltage level; monitoring a voltage level of a signal output from the first pin for a period of time; and detecting water in the receptacle based on whether the voltage level of the signal output from the first pin is within a range.

According to some example embodiments of the inventive concepts, there is provided a semiconductor device that includes a receptacle including a plurality of pins including a first pin and a second pin; a PD IC configured to detect a signal output from the first pin in response to a signal transmitted thereto; and a USB chipset configured to detect a voltage level of a signal output from the second pin in response to a signal transmitted thereto, wherein at least one of the PD IC and the USB chipset is configured to transmit a toggle voltage signal to a respective one of the first pin and the second pin such that the toggle voltage signal toggles between a first voltage level and a second voltage level.

BRIEF DESCRIPTION OF THE DRAWINGS

These and/or other aspects will become apparent and more readily appreciated from the following description of the example embodiments, taken in conjunction with the accompanying drawings in which:

FIG. 2 illustrates a USB type-C receptacle interface according to an example embodiment.

DETAILED DESCRIPTION

Figure 1:
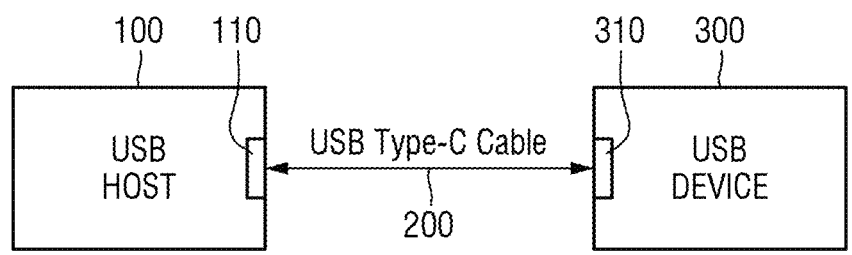
FIG. 1 is a block diagram of a semiconductor system according to an example embodiment.

FIG. 1 is a block diagram of a semiconductor system according to an example embodiment.

Referring to FIG. 1, the semiconductor system according to an example embodiment may include a universal serial bus (USB) host 100, a USB device 300, and a USB cable 200 which electrically connects the USB host 100 and the USB device 300.

The USB host 100 is a host computer system equipped with a USB host controller. The USB device 300 may include an auxiliary device or a hub that meets the USB standard. The USB host 100 and the USB device 300 may respectively include receptacle interfaces 110 and 310 that conform to a USB interface, and the receptacle interfaces 110 and 310 may be electrically connected to each other by the USB cable 200.

In some example embodiments, the USB host 100 may provide a USB type-C interface. That is, the receptacle interface 110 of the USB host 100 may be a USB type-C receptacle interface, and the USB cable 200 which electrically connects the USB host 100 and the USB device 300 may be a USB type-C cable.

The USB type-C interface may be implemented based on, e.g., the USB 2.0 or USB 3.1 definition.

FIG. 2 illustrates a USB type-C receptacle interface according to an example embodiment.

Referring to FIG. 2, a USB type-C receptacle may be upside up or upside down. In addition, the USB-type-C receptacle may have the same interface with either of the USB host 100 and the USB device 300.

The receptacle interface includes a plurality of pins A1 through A12 and B1 through B12.

Specifically, the pins A1, A12, B1 and B12 correspond to GND signal pins, and the pins A4, A9, B4 and B9 correspond to USB cable bus power ($V_{BUS}$) signal pins. These pins provide power and ground voltage signals.

The pins A2, A3, B11 and B10 correspond to a TX1+ signal pin, a TX1− signal pin, an RX1+ signal pin and an RX1− signal pin, respectively. The pins B2, B3, A11 and A10 correspond to a TX2+ signal pin, a TX2− signal pin, an RX2+ signal pin and an RX2− signal pin, respectively. These pins provide a data transfer path according to USB 3.1.

The pins A6 and A7 correspond to a D+ signal pin and a D− signal pin, respectively. The pins B6 and B7 correspond to another D+ signal pin and another D− signal pin, respectively. These pins provide a data transfer path according to USB 2.0.

The pins A8 and B8 correspond to an SBU1 signal pin and an SBU2 signal pin, respectively. These pins correspond to sideband use pins.

The pins A5 and B5 correspond to a CC1 signal pin and a CC2 signal pin, respectively. These pins correspond to pins that sense the connection of a USB device and set an interface using a USB type-C cable and connector.

This receptacle interface is merely an example of the USB type-C receptacle interface and can be modified according to a specific implementation purpose as obvious to those of ordinary skill in the art.

Figure 3:
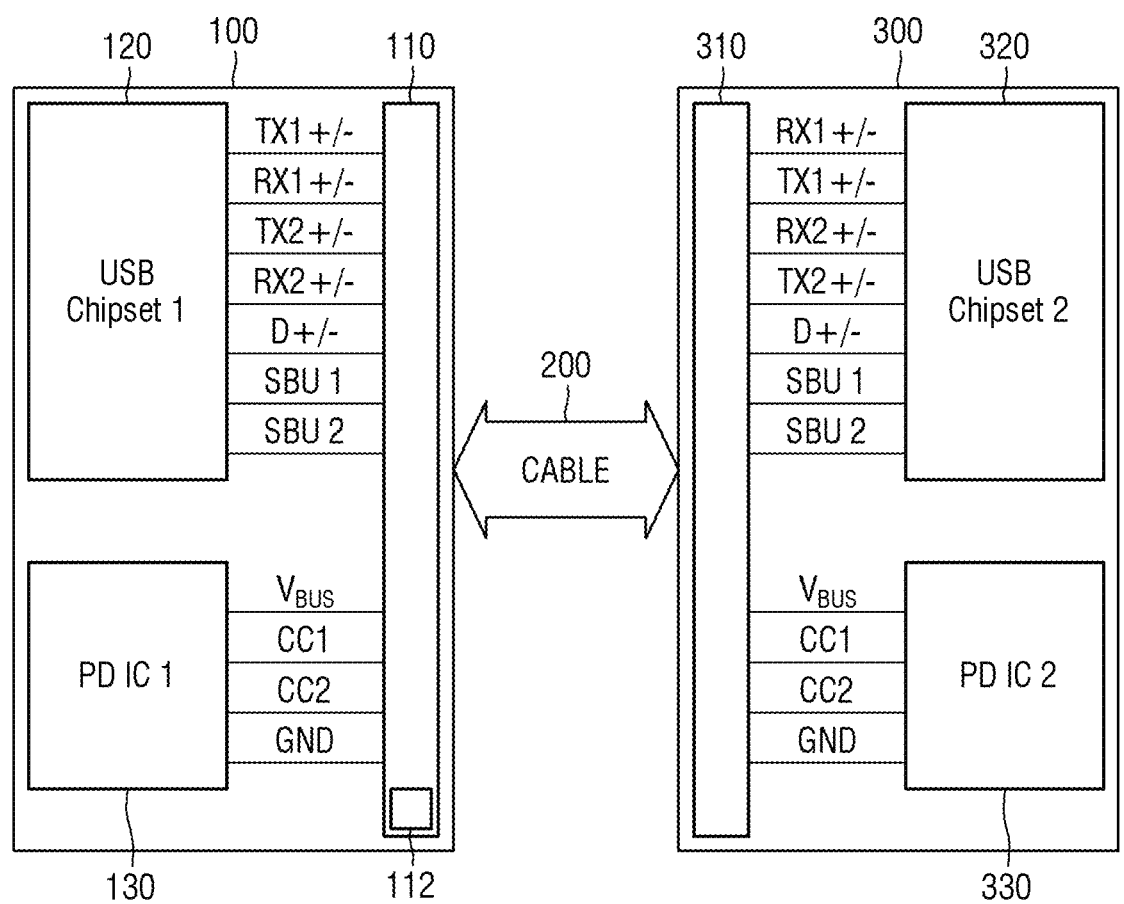
FIG. 3 is a block diagram of a semiconductor device according to an example embodiment.

FIG. 3 is a block diagram of a semiconductor device according to an example embodiment.

Referring to FIG. 3, the semiconductor device according to an example embodiment may be a USB host 100. The USB host 100 may include a receptacle interface 110, a USB chipset 120, and a power delivery integrated circuit (PD IC) 130.

Likewise, a USB device 300 may include a receptacle interface 310, a USB chipset 320, and a PD IC 330.

The USB host 100 and the USB device 300 may exchange data through a cable 200 by using the receptacle interface 110 and the receptacle interface 310, respectively.

Each of the receptacle interfaces 110 and 310 includes a plurality of pins for implementing an interface such as the interface described above with reference to FIG. 2. In some example embodiments, the receptacle interface 110 according to various example embodiments may further include a MID (RID) pin 112 in addition to the pins described above with reference to FIG. 2.

The USB chipset 120 and the PD 130 may each include memory and processing circuitry (not shown).

The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The processing circuitry may include a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design and/or execution of computer readable instructions stored in the memory, as a special purpose computer to communicate with the USB device 300 by detecting the presence of the USB device 300.

The USB chipset 120 may input and output a TX1+/− signal, an RX1+/− signal, a TX2+/− signal, an RX2+/− signal, a D+/− signal, an SBU1 signal and an SBU2 signal and exchange these signals with the USB chipset 320. Similarly, the USB chipset 320 may input and output an RX1+/− signal, a TX1+/− signal, an RX2+/− signal, a TX2+/− signal, a D+/− signal, an SBU1 signal and an SBU2 signal and exchange these signals with the USB chipset 120.

The PD IC 130 may input and output a USB cable bus power ($V_{BUS}$) signal, a CC1 signal, a CC2 signal and a GND signal and exchange these signals with the PD IC 330. Similarly, the PD IC 330 may input and output a USB cable bus power ($V_{BUS}$) signal, a CC1 signal, a CC2 signal and a GND signal and exchange these signals with the PD IC 130.

Here, the CC1 signal and the CC2 signal are configuration channel signals and used to detect whether the USB host 100 and the USB device 300 are connected to each other.

A USB type-C receptacle interface provides a pull-up current to a CC1 signal pin and a CC2 signal pin included in the receptacle interface 110 and observes whether the CC1 signal pin or the CC2 signal pin is pulled down in order to determine whether the USB device 300 has been connected to the USB host 100.

Specifically, before the USB host 100 and the USB device 300 are connected by the cable 200, a pull-up current is supplied to the CC1 signal pin of the USB host 100 while the CC1 signal pin of the USB device 300 is connected to GND through a pull-down resistor Rd. When the USB host 100 and the USB device 300 are connected by the cable 200, the current being supplied to the CC1 signal pin of the USB host 100 is delivered to the CC1 signal pin of the USB host 100 through the cable 200 and then flows to GND through the pull-down resistor Rd connected to the CC1 signal pin of the USB device 300. That is, the USB type-C receptacle interface may determine whether the USB host 100 and the USB 300 have been connected by the cable 200 by observing a change in the voltage levels of the CC1 signal pin and the CC2 signal pin included in the receptacle interface 110.

However, if the USB device 300 is not connected to the receptacle interface 110 of the USB host 100 and if foreign matter, particularly water, is applied to the receptacle interface 110, the current being supplied to the CC1 signal pin of the USB host 100 may be pulled down through, e.g., a GND signal pin of the USB host 100 due to the water. Therefore, it may be difficult to determine whether the cause of the pull-down is the connection of the USB device 300 or the application of the water by simply observing a change in the voltage levels of the CC1 signal pin and the CC2 signal pin included in the receptacle interface 110.

Therefore, in one or more embodiments, a semiconductor device is configured to provide a toggle voltage signal that is repeatedly pulled up and pulled down or repeatedly pulled up and opened to toggle between voltage levels to a plurality of pins, e.g., the CC1 signal pin and the CC2 signal pin included in the receptacle interface 110 of the USB host 100. The semiconductor device may observe a change in the voltage levels of the plurality of pins e.g., the CC1 signal pin and the CC2 signal pin. In this way, whether water has been applied to the receptacle interface 110 is determined.

The pull-up, pull-down, and open operations of a semiconductor device according to an example embodiment will hereinafter be described with reference to FIGS. 4A through 4C.

Figure 4A:
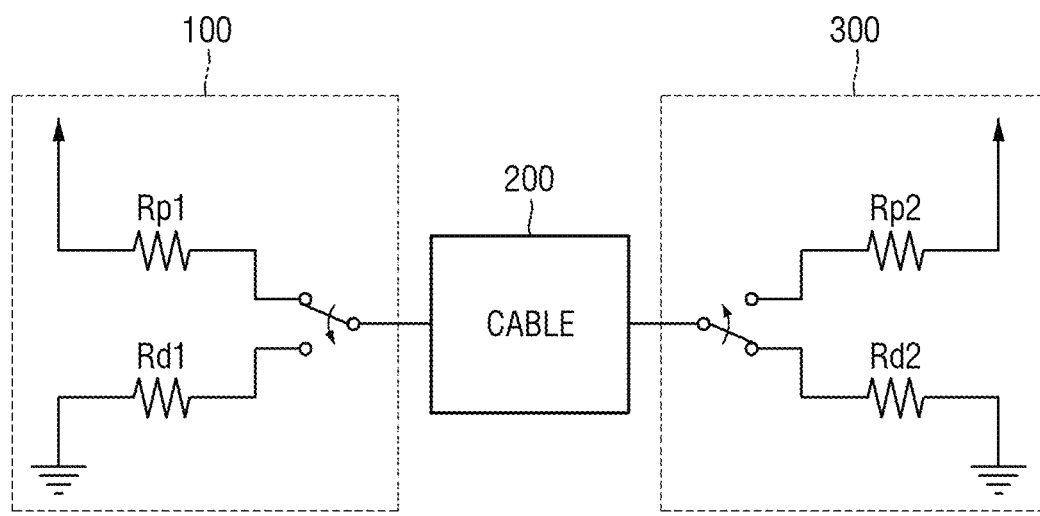
FIG. 4A is a block diagram illustrating a pull-up operation of a semiconductor device according to an example embodiment.

FIG. 4A is a block diagram illustrating a pull-up operation of a semiconductor device according to an example embodiment.

Referring to FIG. 4A, a USB host 100, that is, a semiconductor device 100 according to an example embodiment may include a pull-up resistor Rp1 and a pull-down resistor Rd1. In addition, a USB device 300 includes a pull-up resistor Rp2 and a pull-down resistor Rd2.

The pull-up resistors Rp1 and Rp2 described in the current example embodiment can be expressed as current sources in circuits. In this case, each of the current sources corresponding to the pull-up resistors Rp1 and Rp2 may be designed to output a current in the range of, e.g., 80 uA+/−20%, 180 uA+/−8%, or 330 uA+/−8% according to the requirements of the USB type-C specification. However, the scope of example embodiments of the inventive concepts is not limited to this case, and a current source having a different capacitance can also be used depending on the purpose of implementation.

Each of the pull-down resistors Rd1 and Rd2 described in the current example embodiment may be designed to have a value of, e.g., 5.1 kΩ according to the requirements of the USB type-C specification. However, the scope of example embodiments of the inventive concepts is not limited to this case, and a resistor having a different resistance value can also be used depending on the purpose of implementation.

A cable 200 may be connected to the pull-up resistors Rp1 and Rp2 or the pull-down resistors Rd1 and Rd2 by pins included in a receptacle interface 110.

The pull-up operation of the USB host 100 refers to an operation of pulling up a specific pin in the receptacle interface 110. The pull-up resistor Rp1 may be connected to the cable 200 and the pull-down resistor Rd1 may be disconnected from the cable 200 by opening and closing a switch in the USB host 100 of FIG. 4A. Accordingly, a pull-up current may be provided to the specific pin.

In this case, if the USB device 300 is connected to the USB host 100, the pull-up current may flow through the cable 200 to GND via the pull-down resistor Rd2 of the USB device 300.

Figure 4B:
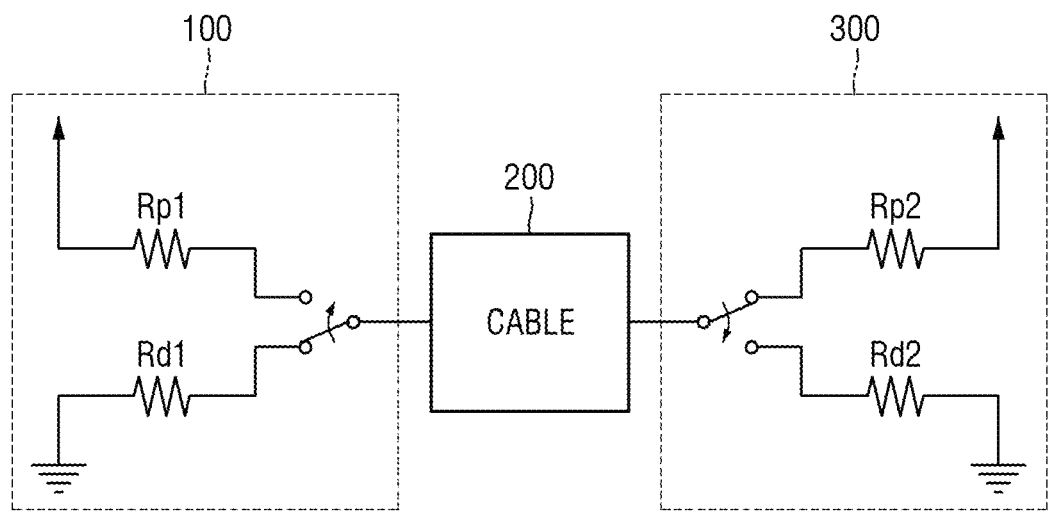
FIG. 4B is a block diagram illustrating a pull-down operation of the semiconductor device according to the example embodiment.

FIG. 4B is a block diagram illustrating a pull-down operation of the semiconductor device according to an example embodiment.

The pull-down operation of the USB host 100 refers to an operation of pulling down a specific pin in the receptacle interface 110. The pull-down resistor Rd1 may be connected to the cable 200 and the pull-up resistor Rp1 may be disconnected from the cable 200 by opening and closing the switch in the USB host 100 of FIG. 4B.

Figure 4C:
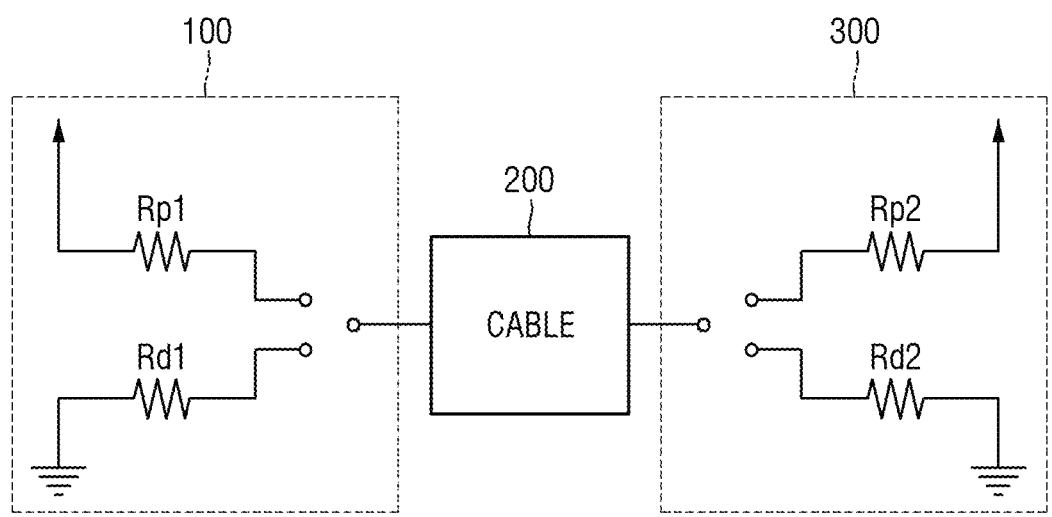
FIG. 4C is a block diagram illustrating an open operation of the semiconductor device according to the example embodiment.

FIG. 4C is a block diagram illustrating an open operation of the semiconductor device according to an example embodiment.

The open operation of the USB host 100 refers to an operation of opening a specific pin in the receptacle interface 110. In FIG. 4C, the switch in the USB host 100 is open. In other words, the pull-up resistor Rp1 and the pull-down resistor Rd1 are disconnected from the cable 200.

Figure 5:
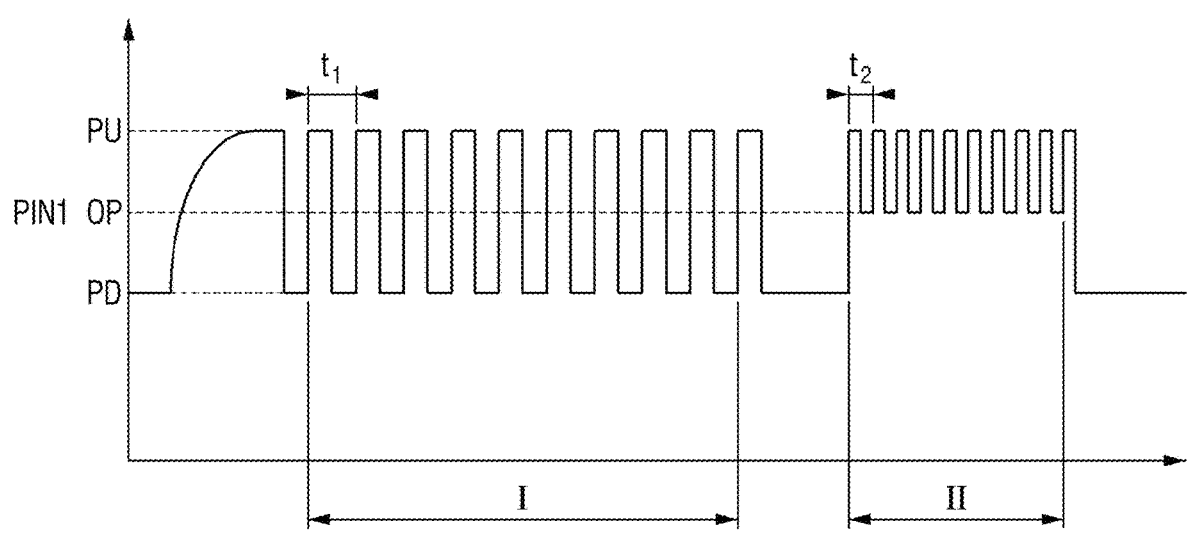
FIG. 5 illustrates an operation example of a semiconductor device according to an example embodiment.

FIG. 5 illustrates an operation example of a semiconductor device according to an example embodiment.

Referring to FIG. 5, a toggle voltage signal is transmitted to a first pin (PIN1). Specifically, a toggle voltage signal that toggles between a first voltage level and a second voltage level is transmitted to the first pin. The first voltage level may correspond to PU in FIG. 5, and the second voltage level may correspond to OP or PD in FIG. 5.

In some example embodiments, the first pin may include any one of a CC1 signal pin and a CC2 signal pin. In this case, a PD IC 130 transmits the toggle voltage signal to the first pin.

In some an example embodiments, the first pin may include any one of a TX1+ signal pin, a TX1− signal pin, an RX1+ signal pin, an RX1− signal pin, a TX2+ signal pin, a TX2− signal pin, an RX2+ signal pin, an RX2− signal pin, a D+ signal pin, a D− signal pin, an SBU1 signal pin, an SBU2 signal pin, and a MID (RID) pin. In this case, a USB chipset 120 transmits the toggle voltage signal to the first pin.

In a first period I, a toggle voltage signal repeatedly pulled up and pulled down may be generated and transmitted to the first pin. In this case, time lengths of a pulled-up section and a pulled-down section of the toggle voltage signal may be equal or different from each other.

For example, a toggle voltage signal transmitted to the first pin in the first period I may be repeatedly pulled up and pulled down to toggle between the first voltage level (PU) and the second voltage level (PD). In this case, time lengths of a pulled-up section and a pulled-down section of the toggle voltage signal may be equal to each other.

Here, the toggle voltage signal transmitted to the first pin in the first period I may be set to have a first frequency. That is, the length of a pair of the pulled-up section and the pulled-down section, that is, the length of a unit section may be set to, for example, t1.

In some example embodiments, t1 may be set to, for example, about 1 ms. In addition, the toggle voltage signal may be set to include, for example, 10 unit sections in the first period I.

In a second period II, a toggle voltage signal repeatedly pulled up and opened may be generated and transmitted to the first pin. In this case, time lengths of a pulled-up section and an opened section of the toggle voltage signal may be equal or different from each other.

For example, a toggle voltage signal transmitted to the first pin in the second period II may be repeatedly pulled up and opened to toggle between the first voltage level (PU) and the second voltage level (OP). In this case, time lengths of a pulled-up section and an opened section of the toggle voltage signal may be equal to each other.

Here, the toggle voltage signal transmitted to the first pin in the second period II may be set to have a second frequency different from the first frequency. That is, the length of a pair of the pulled-up section and the pulled-down section, that is, the length of a unit section, may be set to, for example, t2. In the current example embodiment, the second frequency is higher than the first frequency.

In some an example embodiments, t2 may be set to, for example, about 0.1 ms. In addition, the toggle voltage signal may be set to include, for example, 10 unit sections in the second period II.

After these toggle voltage signals are transmitted to the first pin, the PD IC 130 or the USB chipset 120 detects whether foreign matter (e.g., water) exists in a receptacle based on whether the voltage level of a signal output from the first pin falls within a desired (or, alternatively, a predetermined) range.

Here, the desired (or, alternatively, predetermined) range may include a voltage level range greater than a voltage level judged to be logic low (L) at the first pin and less than a voltage level judged to be logic high (H) at the first pin. For example, when the voltage level judged to be logic low (L) at the first pin is 0 V to 150 mV and the voltage level judged to be logic high (H) is 2.4 to 3.4 V, the PD IC 130 or the USB chipset 120 may determine whether the voltage level of a signal output from the first pin is within the range of more than 150 mV and less than 2.4 V. When the voltage level of the signal output from the first pin is within the range of 150 mV to 2.4 V, the PD IC 130 or the USB chipset 120 may determine that there is water providing a false indicia of a connection to the USB device. When the voltage level of the signal output from the first pin is not within the range of 150 mV to 2.4 V, the PD IC 130 or the USB chipset 120 may determine that there is no water, and for example, that a USB device 300 has been connected.

In some example embodiments, the above determination may be made as follows. When the number of times where a signal output from the first pin as a result of transmitting a toggle voltage signal including N unit sections (where N is a natural number) to the first pin is within the range is equal or greater than M (where M is a natural number smaller than or equal to N), it may be determined that water is present. When the number of cases where the signal output from the first pin is within the range is smaller than M, it may be determined that no water is present. Here. N and M can be set to various values according to the specific purpose of design.

The water may include salt water and fresh water. An equivalent resistance value of the fresh water is larger than that of the salt water, and an equivalent capacitor value of the fresh water is lower than that of the salt water. To discriminate between the fresh water and the salt water, a toggle voltage signal may be transmitted to the first pin under different conditions.

In this case, whether the salt water exists in the receptacle may be detected in the first period I. and whether the fresh water exists in the receptacle may be detected in the second period II.

If it is determined that the salt water of the receptacle has been detected in the first period I, the PD IC 130 may delay the supply of bus power $V_{BUS}$ and continuously repeat the water detection. In addition, if it is determined that the fresh water of the receptacle has been detected in the second period II although the salt water of the receptacle has not been detected in the first period I, the PD IC 130 may delay the supply of the bus power $V_{BUS}$ and continuously repeat the water detection.

In the current example embodiment, a case where the fresh water is detected after the salt water has been described. However, the order of detection may vary. In addition, in the current example embodiment, a case where detection is performed twice in the first period I and the second period II has been described. However, the detection can also be performed three or more times by varying the setting of the toggle voltage signal to detect various types of water.

Figure 6:
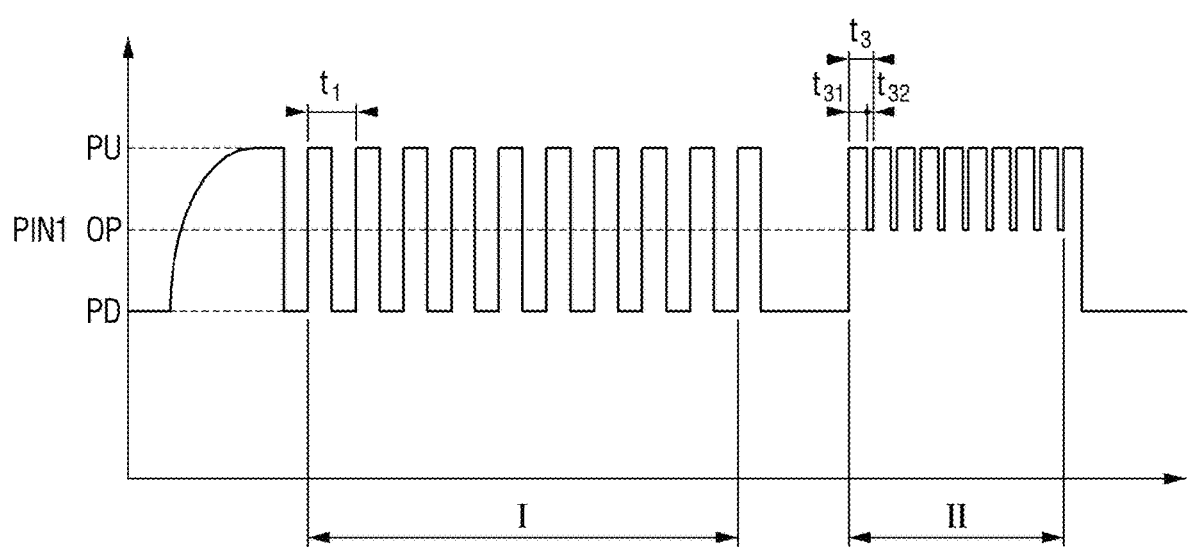
FIG. 6 illustrates another operation example of the semiconductor device according to the example embodiment.

FIG. 6 illustrates another operation example of the semiconductor device according to an example embodiment.

Referring to FIG. 6, a toggle voltage signal transmitted to the first pin in the first period I is repeatedly pulled up and pulled down to toggle between a first voltage level (PU) and a second voltage level (PD). In this case, time lengths of a pulled-up section and a pulled-down section of the toggle voltage signal may be equal to each other.

Here, the toggle voltage signal transmitted to the first pin in the first period I may be set to have a first frequency. That is, the length of a pair of the pulled-up section and the pulled-down section, that is, the length of a unit section may be set to, for example, t1.

In some example embodiments, t1 may be set to, for example, about 1 ms. In addition, the toggle voltage signal may be set to include, for example, 10 unit sections in the first period I.

A toggle voltage signal transmitted to the first pin in the second period II may be repeatedly pulled up and opened to toggle between the first voltage level (PU) and the second voltage level (OP). In this case, time lengths of a pulled-up section and an opened section of the toggle voltage signal may be different from each other.

Here, the toggle voltage signal transmitted to the first pin in the second period II may be set to have a second frequency different from the first frequency. That is, the length of a pair of the pulled-up section and the pulled-down section, that is, the length of a unit section, may be set to, for example, t3. In the current example embodiment, the second frequency is higher than the first frequency.

In some example embodiments, t3 may be set to, for example, about 0.11 ms. In particular, time lengths t31 and t32 of the pulled-up and opened sections of the toggle voltage signal may be set to about 0.1 ms and about 0.01 ms, respectively. In addition, the toggle voltage signal may be set to include, for example, 10 unit sections in the second period II.

After these toggle voltage signals are transmitted to the first pin, the PD IC 130 or the USB chipset 120 detects whether water exists in the receptacle based on whether the voltage level of a signal output from the first pin falls within a desired (or, alternatively, a predetermined) range.

As described above with reference to FIG. 5, whether salt water exists in the receptacle may be detected in the first period I, and whether fresh water exists in the receptacle may be detected in the second period II.

If it is determined that the salt water of the receptacle has been detected in the first period I, the PD IC 130 may delay the supply of the bus power $V_{BUS}$ and continuously repeat the water detection. In addition, if it is determined that the fresh water of the receptacle has been detected in the second period II although the salt water of the receptacle has not been detected in the first period I, the PD IC 130 may delay the supply of the bus power $V_{BUS}$ and continuously repeat the water detection.

Figure 7:
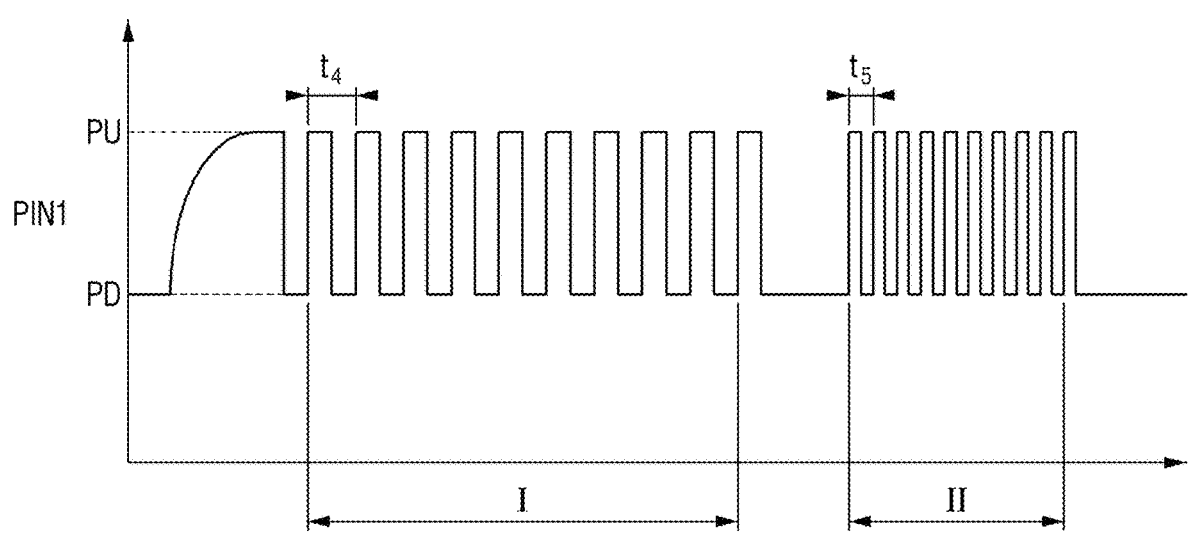
FIG. 7 illustrates another operation example of the semiconductor device according to the example embodiment.

FIG. 7 illustrates another operation example of the semiconductor device according to an example embodiment.

Referring to FIG. 7, a toggle voltage signal transmitted to the first pin in the first period I is repeatedly pulled up and pulled down to toggle between a first voltage level (PU) and a second voltage level (PD). In this case, time lengths of a pulled-up section and a pulled-down section of the toggle voltage signal may be equal to each other.

Here, the toggle voltage signal transmitted to the first pin in the first period I may be set to have a first frequency. That is, the length of a pair of the pulled-up section and the pulled-down section, that is, the length of a unit section may be set to, for example, t4.

In some example embodiments, t4 may be set to, for example, about 1 ms. In addition, the toggle voltage signal may be set to include, for example, 10 unit sections in the first period I.

A toggle voltage signal transmitted to the first pin in the second period II may be repeatedly pulled up and pulled down to toggle between the first voltage level (PU) and the second voltage level (PD). In this case, time lengths of a pulled-up section and a pulled-down section of the toggle voltage signal may be equal to each other.

Here, the toggle voltage signal transmitted to the first pin in the second period II may be set to have a second frequency different from the first frequency. That is, the length of a pair of the pulled-up section and the pulled-down section, that is, the length of a unit section, may be set to, for example, t5. In the current example embodiment, the second frequency is higher than the first frequency.

In some example embodiments, t5 may be set to, for example, about 0.10 ms. In addition, the toggle voltage signal may be set to include, for example, 10 unit sections in the second period II.

After these toggle voltage signals are transmitted to the first pin, the PD IC 130 or the USB chipset 120 detects whether water exists in the receptacle based on whether the voltage level of a signal output from the first pin falls within a desired (or, alternatively, a predetermined) range.

As described above with reference to FIG. 5, whether salt water exists in the receptacle may be detected in the first period I, and whether fresh water exists in the receptacle may be detected in the second period II.

If it is determined that the salt water of the receptacle has been detected in the first period I, the PD IC 130 may delay the supply of the bus power $V_{BUS}$ and continuously repeat the water detection. In addition, if it is determined that the fresh water of the receptacle has been detected in the second period II although the salt water of the receptacle has not been detected in the first period I, the PD IC 130 may delay the supply of the bus power $V_{BUS}$ and continuously repeat the water detection.

Figure 8:
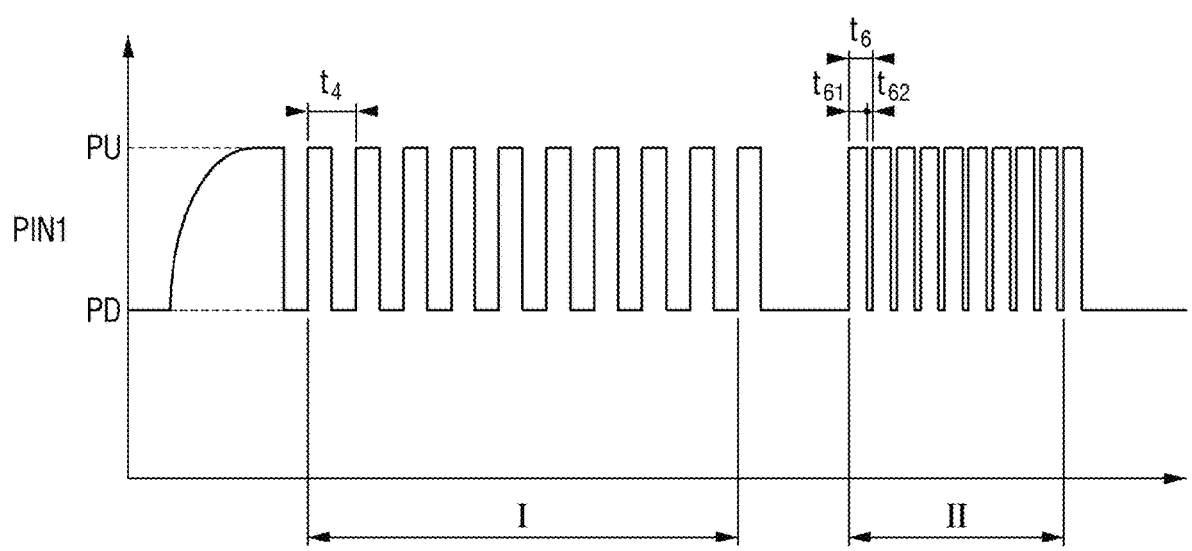
FIG. 8 illustrates another operation example of the semiconductor device according to the example embodiment.

FIG. 8 illustrates another operation example of the semiconductor device according to an example embodiment.

Referring to FIG. 8, a toggle voltage signal transmitted to the first pin in the first period I is repeatedly pulled up and pulled down to toggle between a first voltage level (PU) and a second voltage level (PD). In this case, time lengths of a pulled-up section and a pulled-down section of the toggle voltage signal may be equal to each other.

Here, the toggle voltage signal transmitted to the first pin in the first period I may be set to have a first frequency. That is, the length of a pair of the pulled-up section and the pulled-down section, that is, the length of a unit section may be set to, for example, t4.

In some example embodiments, t4 may be set to, for example, about 1 ms. In addition, the toggle voltage signal may be set to include, for example, 10 unit sections in the first period I.

A toggle voltage signal transmitted to the first pin in the second period II may be repeatedly pulled up and pulled down to toggle between the first voltage level (PU) and the second voltage level (PD). In this case, time lengths of a pulled-up section and a pulled-down section of the toggle voltage signal may be different from each other.

Here, the toggle voltage signal transmitted to the first pin in the second period II may be set to have a second frequency different from the first frequency. That is, the length of a pair of the pulled-up section and the pulled-down section, that is, the length of a unit section, may be set to, for example, t6. In the current example embodiment, the second frequency is higher than the first frequency.

In some example embodiments, t6 may be set to, for example, about 0.11 ms. In particular, time lengths t61 and t62 of the pulled-up and pulled-down sections of the toggle voltage signal may be set to about 0.1 ms and about 0.01 ms, respectively. In addition, the toggle voltage signal may be set to include, for example, 10 unit sections in the second period II.

After these toggle voltage signals are transmitted to the first pin, the PD IC 130 or the USB chipset 120 detects whether water exists in the receptacle based on whether the voltage level of a signal output from the first pin falls within a desired (or, alternatively, predetermined) range.

As described above with reference to FIG. 5, whether salt water exists in the receptacle may be detected in the first period I. and whether fresh water exists in the receptacle may be detected in the second period II.

If it is determined that the salt water of the receptacle has been detected in the first period I, the PD IC 130 may delay the supply of the bus power $V_{BUS}$ and continuously repeat the water detection. In addition, if it is determined that the fresh water of the receptacle has been detected in the second period II although the salt water of the receptacle has not been detected in the first period I, the PD IC 130 may delay the supply of the bus power $V_{Bu}s$ and continuously repeat the water detection.

Figure 9:
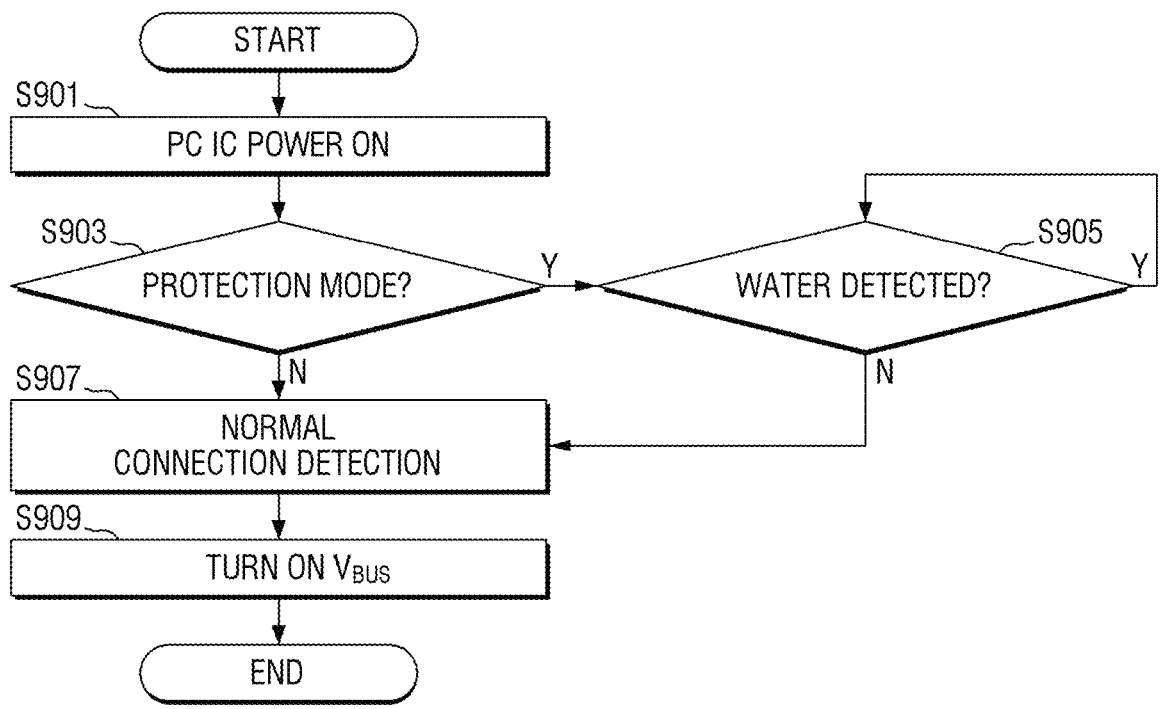
FIGS. 9 and 10 are flowcharts illustrating a method of operating a semiconductor device according to an example embodiment.
Figure 10:
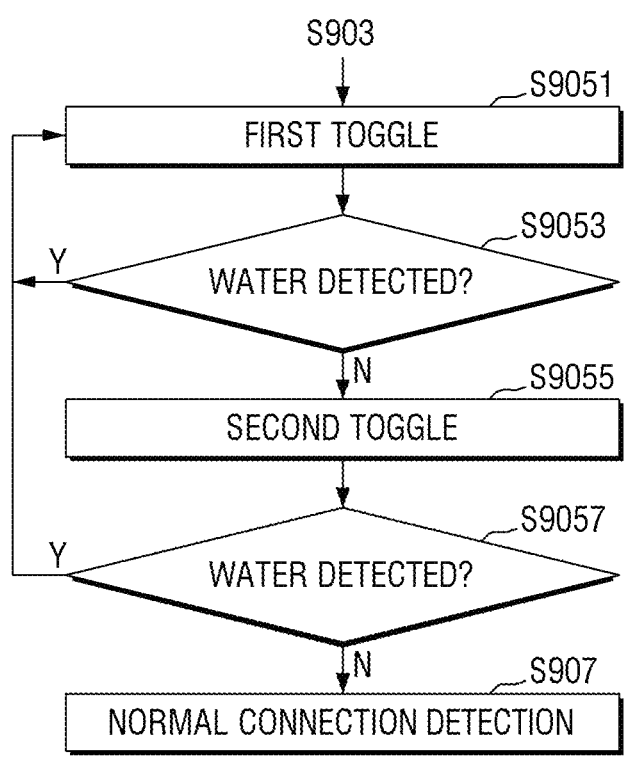

FIGS. 9 and 10 are flowcharts illustrating a method of operating a semiconductor device according to an example embodiment.

Referring to FIG. 9, in the method of operating a semiconductor device according to the current example embodiment, in operation S901, a PD IC 130 may be powered on.

In operation S903, the PD IC 130 or the USB chipset 120 may determine whether to enter a protection mode.

Unlike a normal mode in which a downstream facing port (DFP), an upstream facing port (UFP), and a dual-role port (DRP) according to the USB type-C specification are performed, the protection mode is an operation mode in which it is determined whether water has been applied to a receptacle interface 110.

If the PD IC 130 or the USB chipset 120 determines to enter the normal mode instead of the protection mode, in operation S907, the DFP, the UFP, and the DRP according to the USB type-C specification are performed to detect a USB device 300.

If the PD IC 130 or the USB chipset 120 determines to enter the protection mode, in operation S905, as discussed in more detail below with reference to FIG. 10, the PD IC 130 or the USB chipset 120 may determine whether water has been applied to the receptacle interface 110 of a USB host 100.

If water has been applied to the receptacle interface 110, the PD IC 130 or the USB chipset 120 may repeat operation S905.

When no water is detected in the receptacle interface 110, in operation S907, the DFP, the UFP, and the DRP according to the USB type-C specification are performed in the normal mode using a first current to determine whether the USB device 300 has been connected.

When the USB device 300 is determined as being connected, in operation S909, the PD IC 130 may supply a USB cable bus power ($V_{BUS}$) signal to the USB device 300.

Referring to FIG. 10, operation S905 of FIG. 9 may include operations S9051 through S9057.

In operation S9051, the PD IC 130 or the USB chipset 120 may transmit a first toggle voltage signal that toggles between a first voltage level and a second voltage level to a first pin among a plurality of pins according to a USB type-C receptacle interface. Then, the PD IC 130 or the USB chipset 120 may monitor the voltage level of a signal output from the first pin for a desired (or, alternatively, a predetermined) period of time.

For example, the first toggle voltage signal may be a toggle voltage signal used to detect salt water in the first period I of FIGS. 5 through 8.

In operation S9053, the PD IC 130 or the USB chipset 120 may determine whether water is present in a receptacle based on whether the voltage level of the signal output from the first pin falls within a desired (or, alternatively, a predetermined) range. For example, the presence of water may be determined based on whether the voltage level of the signal output from the first pin is within a voltage level range greater than a voltage level judged to be logic low (L) at the first pin and less than a voltage level judged to be logic high (H) at the first pin.

When water is detected (Y in operation S9053), the PD IC 130 may delay the supply of the bus power $V_{BUS}$, and the water detection may be continuously repeated.

When water is not detected (N in operation S9053), at step S9055, the PD IC 130 or the USB chipset 120 may transmit a second toggle voltage signal that toggles between a third voltage level and a fourth voltage level to the first pin among the pins according to the USB type-C receptacle interface. Then, the PD IC 130 or the USB chipset 120 may monitor the voltage level of a signal output from the first pin for a desired (or, alternatively, predetermined) period of time.

For example, the second toggle voltage signal in operation S9057 may be a toggle voltage signal used to detect fresh water in the second period II of FIGS. 5 through 8.

In operation S9057, the PD IC 130 or the USB chipset 120 may determine whether water is present in the receptacle based on whether the voltage level of the signal output from the first pin falls within a desired (or, alternatively, a predetermined) range. For example, the presence of water is determined based on whether the voltage level of the signal output from the first pin is within a voltage level range greater than a voltage level judged to be logic low (L) at the first pin and less than a voltage level judged to be logic high (H) at the first pin.

When water is detected (Y in operation S9057), the PD IC 130 may delay the supply of the bus power $V_{BUS}$, and the water detection may be continuously repeated.

When water is not detected (N in operation S9057), the PD IC 130 or the USB chipset 120 may perform operation S907 of FIG. 9.

According to various example embodiments, it may possible to effectively reduce a probability of (or, alternatively, prevent) pins included in a receptacle from being corroded by foreign matter, particularly, water applied to a USB type-C receptacle interface. In addition, it may possible to effectively discriminate between various types of water including fresh water and salt water.

While example embodiments of the inventive concepts have been particularly shown and described with reference to some example embodiments thereof, it will be understood by those of ordinary skill in the art that various changes in form and details may be made therein without departing from the spirit and scope of the inventive concepts as defined by the following claims. It is therefore desired that the present example embodiments be considered in all respects as illustrative and not restrictive, reference being made to the appended claims rather than the foregoing description to indicate the scope of the example embodiments.

What is claimed is:

1. A method of operating a semiconductor device, the method comprising:
    transmitting a toggle voltage signal to a first pin among a plurality of pins included in a receptacle according to a USB type-C receptacle interface such that the toggle voltage toggles between a first voltage level and a second voltage level, the transmitting including transmitting, to the first pin, a first toggle voltage signal which toggles at a first frequency, and subsequently transmitting, to the first pin, a second toggle voltage signal which toggles at a second frequency different from the first frequency;
    monitoring a voltage level of a signal output from the first pin for a period of time; and
    detecting water in the USB type-C receptacle based on whether the voltage level of the signal output from the first pin is within a range in response to the transmitting of the first toggle voltage signal and subsequently the second toggle voltage signal to the first pin.

2. The method of claim 1, wherein the transmitting transmits the toggle voltage signal such that the toggle voltage signal is repeatedly pulled up by a pull-up circuit and pulled down by a pull-down circuit and transmitted to the first pin, the pull-up circuit including a pull-up resistor connected between a supply voltage and the first pin and the pull-down circuit including a pull-down resistor connected between a ground voltage and the first pin.

3. The method of claim 2, wherein time lengths of a pulled-up section and a pulled-down section of the toggle voltage signal are equal to each other.

4. The method of claim 2, wherein time lengths of a pulled-up section and a pulled-down section of the toggle voltage signal are different from each other.

5. The method of claim 1, wherein the transmitting transmits the toggle voltage signal such that the toggle voltage signal is repeatedly pulled up by a pull-up circuit, the first pin is subsequently disconnected from the pull-up circuit, and the toggle voltage signal is transmitted to the first pin, the pull-up circuit including a pull-up resistor connected between a supply voltage and the first pin.

6. The method of claim 5, wherein time lengths of a pulled-up section and an opened section of the toggle voltage signal are equal to each other.

7. The method of claim 5, wherein time lengths of a pulled-up section and an opened section of the toggle voltage signal are different from each other.

8. The method of claim 1, wherein the range is greater than a voltage level judged to be logic low and less than a voltage level judged to be logic high.

9. The method of claim 1, further comprising:
delaying supplying of a bus power until the detecting determines that water is not present in the receptacle.

10. The method of claim 1, wherein the first pin includes any one of a configuration channel 1 (CC1) signal pin, a configuration channel 2 (CC2) signal pin, a TX1+ signal pin, a TX1− signal pin, an RX1+ signal pin, an RX1− signal pin, a TX2+ signal pin, a TX2− signal pin, an RX2+ signal pin, an RX2− signal pin, a D+ signal pin, a D− signal pin, an SBU1 signal pin, an SBU2 signal pin, and a MID (RID) pin among the plurality of pins.

11. A semiconductor device comprising:
a receptacle including a plurality of pins according to a universal serial bus (USB) type-C receptacle interface; and
a power delivery integrated circuit (PD IC) configured to,
generate a toggle voltage signal such that the toggle voltage signal is repeatedly pulled up to a first voltage level by connecting a first pin among the pins to a pull-up circuit and pulled down to a second voltage level by one of disconnecting the first pin from the pull-up circuit or connecting the first pin to a pull-down circuit, and the toggle voltage signal includes a first toggle voltage signal which toggles at a first frequency and a second toggle voltage signal which toggles at a second frequency different from the first frequency, and
detect water in the receptacle by,
transmitting the first toggle voltage signal to the first pin and subsequently transmitting the second toggle voltage signal to the first pin such that the toggle voltage signal toggles between the first voltage level and the second voltage level,
detecting a voltage level of a signal output from the first pin, and
detecting whether water is present in the receptacle based on based on whether the voltage level of the signal output from the first pin is within a range, the range being greater than a voltage level judged to be logic low and less than a voltage level judged to be logic high.

12. The semiconductor device of claim 11, wherein time lengths of a pulled-up section and a pulled-down section of the toggle voltage signal are equal to each other.

13. The semiconductor device of claim 11, wherein time lengths of a pulled-up section and a pulled-down section of the toggle voltage signal are different from each other.

14. A semiconductor device comprising:
a receptacle including a plurality of pins according to a USB type-C receptacle interface, the plurality of pins including a first pin and a second pin;
a PD IC configured to transmit a voltage signal to the first pin, and to detect a signal output from the first pin; and
a USB chipset configured to,
generate a toggle voltage signal such that the toggle voltage signal is repeatedly pulled up to a first voltage level by connecting the first pin to a pull-up circuit and pulled down to a second voltage level by one of disconnecting the first pin from the pull-up circuit or connecting the first pin to a pull-down circuit and the toggle voltage signal includes a first toggle voltage signal which toggles at a first frequency and a second toggle voltage signal which toggles at a second frequency different from the first frequency, and
detect water in the receptacle by,
transmitting the first toggle voltage signal to the second pin and subsequently transmitting the second toggle voltage signal to the second pin such that the toggle voltage signal toggles between the first voltage level and the second voltage level,
detecting a voltage level of a signal output from the second pin, and
detecting whether water is present in the receptacle based on whether the voltage level of the signal output from the second pin is within a range, the range being greater than a voltage level judged to be logic low and less than a voltage level judged to be logic high.

15. The semiconductor device of claim 14, wherein the USB chipset is configured to generate the toggle voltage signal such that the toggle voltage signal is repeatedly pulled up and opened, and to transmit the toggle voltage signal to the second pin.

16. The semiconductor device of claim 15, wherein time lengths of a pulled-up section and an opened section of the toggle voltage signal are equal to each other.

17. The semiconductor device of claim 15, wherein time lengths of a pulled-up section and an opened section of the toggle voltage signal are different.

* * * * *